US012584413B2

(12) United States Patent
Van Oflen et al.

(10) Patent No.:    US 12,584,413 B2
(45) Date of Patent:        Mar. 24, 2026

(54) GAS TURBINE ENGINE WITH COMPOSITE AIRFOIL AND METHOD OF FORMING

(71) Applicant: GENERAL ELECTRIC COMPANY, Schenectady, NY (US)

(72) Inventors: Benjamin Thomas Van Oflen, Cincinnati, OH (US); Nicholas Joseph Kray, Mason, OH (US); Gary Willard Bryant, Jr., Loveland, OH (US); Elzbieta Kryj-Kos, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/436,954

(22) Filed: Feb. 8, 2024

(65) Prior Publication Data

US 2025/0257662 A1      Aug. 14, 2025

(51) Int. Cl.
| | |
|---|---|
| *F01D 5/28* | (2006.01) |
| *B32B 5/02* | (2006.01) |
| *B32B 5/26* | (2006.01) |
| *F02C 7/00* | (2006.01) |

(52) U.S. Cl.
CPC .............. *F01D 5/282* (2013.01); *B32B 5/024* (2013.01); *B32B 5/262* (2021.05); *F02C 7/00* (2013.01); *B32B 2307/718* (2013.01); *B32B 2605/18* (2013.01); *F05D 2230/50* (2013.01); *F05D 2300/603* (2013.01)

(58) Field of Classification Search
CPC ....................................... F01D 5/282
See application file for complete search history.

(56) References Cited

U.S. PATENT DOCUMENTS

| | | | |
|---|---|---|---|
| 4,470,862 A | 9/1984 | More et al. | |
| 5,308,228 A | 5/1994 | Benoit | |
| 6,431,837 B1 * | 8/2002 | Velicki .................. F04D 29/324 |
| | | | 416/223 R |
| 6,893,211 B1 | 5/2005 | Eibl et al. | |
| 8,105,042 B2 | 1/2012 | Parkin et al. | |
| 8,419,374 B2 | 4/2013 | Huth et al. | |
| 8,499,450 B2 | 8/2013 | Naik | |
| 8,573,947 B2 | 11/2013 | Klinetob et al. | |
| 8,696,319 B2 | 4/2014 | Naik | |
| 8,753,091 B1 | 6/2014 | Braley et al. | |
| 10,589,475 B2 | 3/2020 | Kray et al. | |
| 10,865,649 B2 * | 12/2020 | Thomas .................... F01D 5/34 |
| 2011/0176927 A1 | 7/2011 | Alexander | |

(Continued)

FOREIGN PATENT DOCUMENTS

| | | |
|---|---|---|
| EP | 2354455 A2 | 8/2011 |
| EP | 2660146 B1 | 1/2018 |

*Primary Examiner* — Gerald L Sung
(74) *Attorney, Agent, or Firm* — McGarry Bair PC

(57) ABSTRACT

A gas turbine engine includes a fan section, a compressor section, combustor section, and turbine section in serial flow arrangement, and defines an engine centerline extending a forward to an aft. A composite airfoil, provided in one of the fan section, the compressor section, or the turbine section can have a balanced mass distribution. A woven core defines a first mass distribution. A set of plies coupled to the woven core collectively defines a second mass distribution, where the second mass distribution is nearer to the balanced mass distribution than the first mass distribution.

20 Claims, 4 Drawing Sheets

(56) References Cited

U.S. PATENT DOCUMENTS

| | | |
|---|---|---|
| 2012/0108699 A1 | 5/2012 | Fang et al. |
| 2016/0160658 A1 | 6/2016 | Mccaffrey |
| 2018/0119549 A1* | 5/2018 | Vetters .................... F01D 5/147 |
| 2023/0003132 A1 | 1/2023 | Jain et al. |
| 2025/0052162 A1* | 2/2025 | Kryj-Kos ................ F01D 5/282 |

* cited by examiner

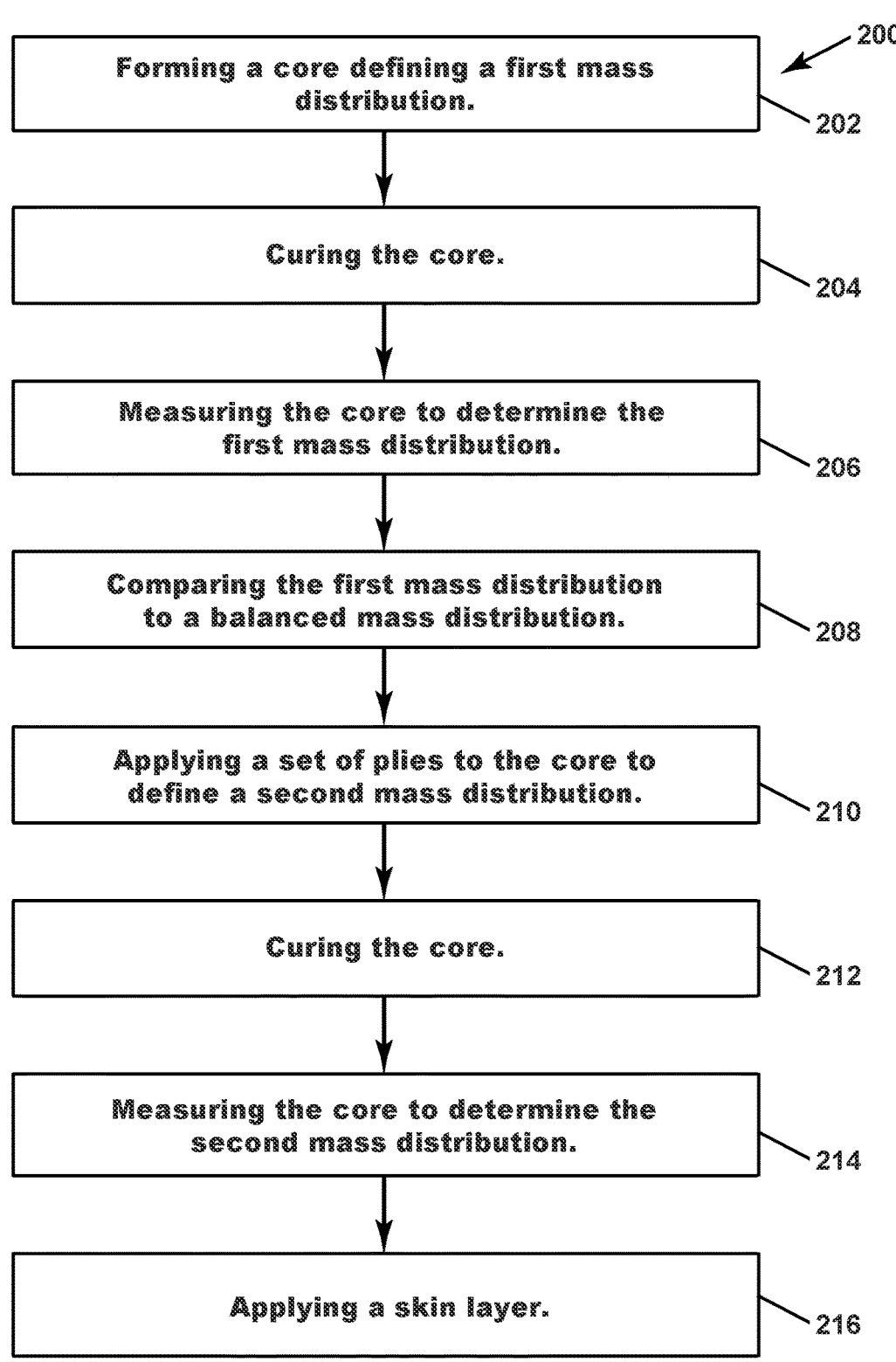

200

Forming a core defining a first mass
distribution.
202

Curing the core.
204

Measuring the core to determine the
first mass distribution.
206

Comparing the first mass distribution
to a balanced mass distribution.
208

Applying a set of plies to the core to
define a second mass distribution.
210

Curing the core.
212

Measuring the core to determine the
second mass distribution.
214

Applying a skin layer.
216

FIG. 4

GAS TURBINE ENGINE WITH COMPOSITE AIRFOIL AND METHOD OF FORMING

TECHNICAL FIELD

The present disclosure relates generally to a component for a gas turbine engine, and more specifically to a composite airfoil and method of forming the composite airfoil.

BACKGROUND

A gas turbine engine typically includes an engine core with a compressor section, a combustor section, and a turbine section in serial flow arrangement. In a bypass turbine engine, a fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

Many components of the gas turbine engine are made from composite materials that can include a fiber-reinforced matrix and exhibit a high strength to weight ratio. Due to the high strength to weight ratio and moldability to adopt relatively complex shapes, composite materials are utilized in various applications, such as the gas turbine engine or an aircraft. Components made from composite materials can be, for example, installed on or define a portion of the fuselage and/or wings, rudder, manifold, airfoil, blades, vanes or other components of the aircraft or gas turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 4 is a flow chart illustrating a method of forming a composite airfoil, in accordance with an aspect of the present disclosure.

DETAILED DESCRIPTION

Figure 1:
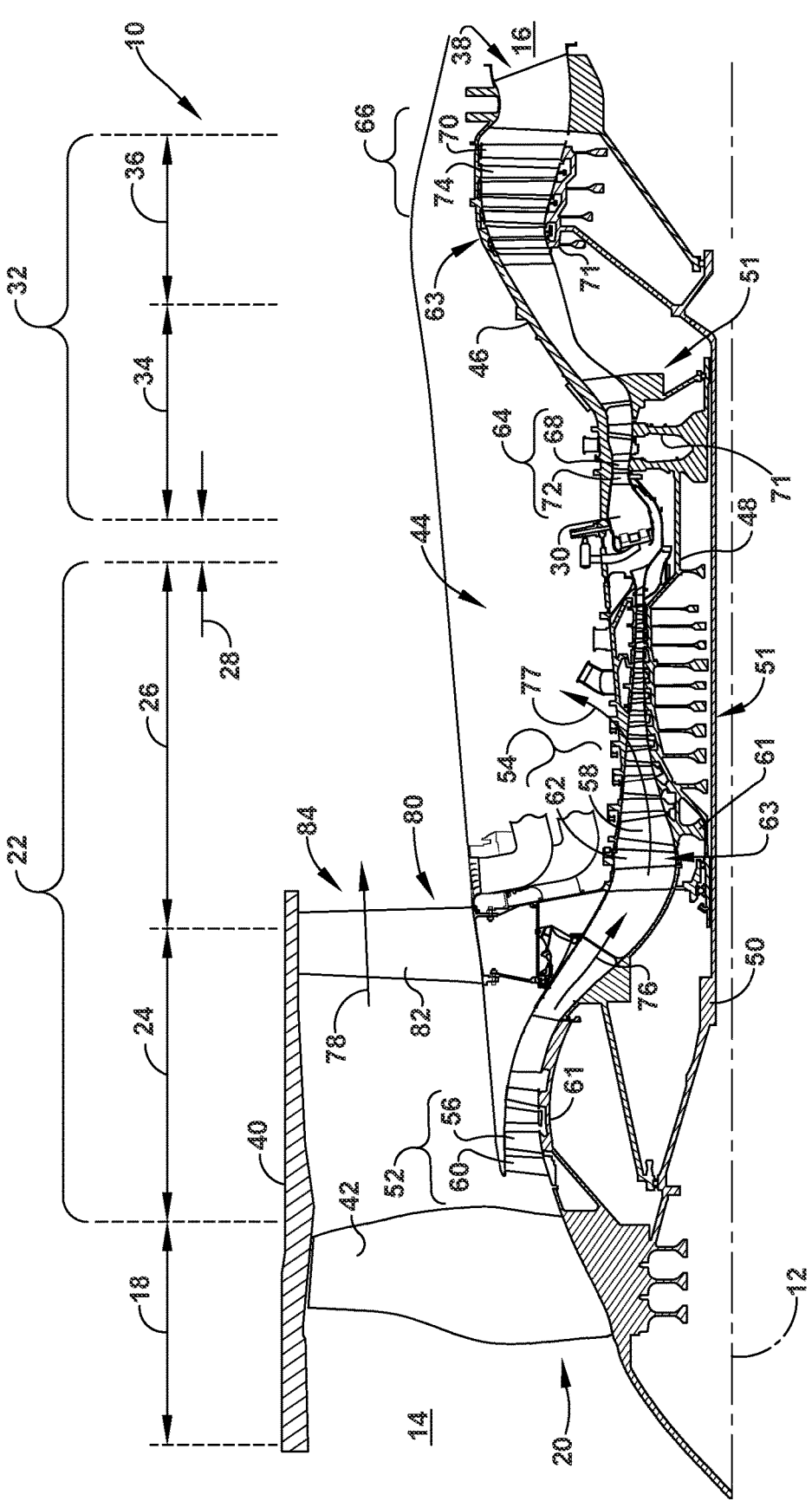
FIG. 1 is a schematic cross-sectional view of a gas turbine engine in accordance with an aspect of the present disclosure.

Aspects of the disclosure herein are directed to a preform or a manufactured core used for an engine component, such as an airfoil. The core can be a woven core, and can include one or more woven layers forming the engine component. The woven core is used to create an engine component for a gas turbine engine. Such an engine component can be an airfoil, for example. It should be understood, however, that the disclosure applies to other engine components of the gas turbine engine, such as a combustor liner, shroud, nozzle, or a disk in non-limiting examples. Further, while described in terms of a core used in the manufacture of an airfoil or aircraft, it will be appreciated that the present disclosure is applied to any other suitable environment, such as terrestrial or non-terrestrial, airborne, land-based, or non-land-based applications.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The terms "forward" mean in front of something and "aft" or "rearward" mean behind something. For example, when used in terms of fluid flow, fore/forward can mean upstream and aft/rearward can mean downstream.

The term "fluid" may be a gas or a liquid, or multi-phase.

As used herein, the terms "radial" or "radially" refer to a direction away from a common center. For example, in the overall context of a gas turbine engine, radial refers to a direction along a ray extending between a center longitudinal axis of the engine and an outer engine circumference.

All directional references (e.g., radial, axial, coaxial, top, upstream, downstream, forward, aft, etc.) as may be used herein are only used for identification purposes to aid the reader's understanding of the present disclosure, and do not create limitations, particularly as to the position, orientation, or use of aspects of the disclosure described herein. Connection references (e.g., coupled, connects) are to be construed broadly and can include intermediate structural elements between a collection of elements and relative movement between elements unless otherwise indicated. As such, connection references do not necessarily infer that those two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

As used herein, the term "weight" or "mass" refers to an intrinsic property of a component or portion thereof, relating to the quantity of matter present. A weight can be defined by the mass of an object being acted upon by gravity on Earth.

As used herein, the term "moment weight" or "moment mass" can be representative of the weight or mass times the distance from a rotational axis. The rotational axis can be defined as rotation about an engine centerline or a rotational axis, rotating about a point on the engine centerline or the rotational axis. The "moment weight" or "moment mass" can be determined as the mass of the component or portion thereof, times the distance from the engine centerline or the rotational axis to a center of mass of the component.

As used herein, the term "center of mass" can represent a point defined by a component representing the mean or average mass of the component. As used herein, the term "center of rotation" can relate to an axial position or point along the engine centerline or the rotational axis aligned with the center of mass, defined in a direction orthogonal to the engine centerline or the rotational axis, such as in a radial direction about the rotational axis.

As used herein, the terms "mass distribution," "first mass distribution," or "second mass distribution" can relate to a spatial distribution of mass or matter within a component or portion thereof. The weight, mass, thickness, local thickness, moment weight, moment mass, center of mass, and center of rotation can be defined based upon the "mass distribution," "first mass distribution," or "second mass distribution." The "mass distribution," "first mass distribution," or "second mass distribution" represents a distribution of mass or matter which collectively defines the weight and mass of the component. The particular arrangement of the mass or matter defines the geometry of the component, which defines the thickness or local thickness. The "mass distribution," "first mass distribution," or "second mass distribution" distribution of mass or matter further defines the moment weight or moment mass, where the distribution of the mass or matter defines the center of mass, and the moment weight or the moment mass can be defined for the component based on the center of mass times the distance from the engine centerline or the rotational axis. The "mass distribution," "first mass distribution," or "second mass distribution" distribution of mass or matter further defines the center of rotation for the component along the engine centerline or the rotational axis, which is determined based on the center of mass of the component aligned orthogonal to the engine centerline or the rotational axis. As used herein, a "balanced mass distribution" can relate to a condition of a component or airfoil where the mass distribution is arranged such that the center of mass of the component is aligned with a balanced center of mass and orthogonally aligned with a balanced center of rotation. Similarly, an "unbalanced mass distribution" can be defined by a misalignment or offset between the center of mass and balanced center of mass or the balanced center of rotation. Balancing the component can include changing the mass distribution to align the physical center of mass of the component with the balanced center of mass and the balanced center of rotation. As used herein, the term "cured mass distribution" can relate to a mass distribution for a component after curing of that component.

The term "composite," as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in mechanical properties, material, and dimension to achieve a particular composite component or composite portion of a component having a predetermined weight, size, or mechanical property.

One or more layers of adhesive can be used in forming or coupling composite components. Adhesives can include resin and phenolics, wherein the adhesive can be cured at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies forming the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers can be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can be finished with post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3·2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a particular chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components that would benefit from the lighter-weight and higher temperature capability these materials can offer.

The term "metallic" as used herein are indicative of a material that includes metal such as, but not limited to, titanium, iron, aluminum, stainless steel, and nickel alloys. A metallic material or alloy can be a combination of at least two or more elements or materials, where at least one is a metal.

The term "preform" as used herein is a three-dimensional composite formed by a plurality of fibers or yarns, including warp fibers or yarns and weft fibers or yarns. The at least some fibers or yarns can be integrated into the preform through weaving, stitching, tufting, or any appropriate manufacturing process. The preform as referenced herein is a fully formed component that is formed in a separate manufacturing process with respect to the fully formed component.

The inventors' practice has proceeded in the foregoing manner of designing a core used in the manufacture of a component such as an airfoil, designing the airfoil to have improved balance and rotational balance, identifying whether or not the component was manufactured as designed and satisfies component objectives, and modifying the engine component with new geometric characteristics in an iterative process when the engine component does not satisfy component objectives. This process is repeated during the design of several different types of components, such as those shown in FIG. 1.

FIG. 1 is a schematic cross-sectional diagram of a gas turbine engine 10 for an aircraft. The gas turbine engine 10 has a generally longitudinally extending axis or engine centerline 12 extending from a forward 14 to an aft 16 defining a forward direction and an aft direction, respectively. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The turbine engine 10, as illustrated, is a turbofan engine. It will be appreciated, however, that the turbine engine 10 can be any suitable engine such as, but not limited to, a turboprop engine, a turboshaft engine, a ducted turbofan engine, an unducted engine, or an open rotor turbine engine.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the gas turbine engine 10, which generates combustion gases. The engine core 44 is surrounded by a core casing 46, which can be coupled with the fan casing 40.

An HP shaft or spool 48 disposed coaxially about the engine centerline 12 of the gas turbine engine 10 and drivingly connects the HP turbine 34 to the HP compressor 26. An LP shaft or spool 50, which is disposed coaxially about the engine centerline 12 of the gas turbine engine 10 within the greater diameter of the annular HP spool 48, drivingly connects the LP turbine 36 to the LP compressor 24 and fan 20. The HP and LP spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the gas turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the gas turbine engine 10.

In operation, the airflow exiting the fan section 18 is split such that a portion of the airflow is channeled into the LP compressor 24, which then supplies a pressurized airflow 76 to the HP compressor 26, which further pressurizes the air.

The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is discharged from the gas turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components utilizing cooling. The temperature of pressurized airflow 76 entering the combustor 30 is significantly increased above the bleed air temperature. The bleed air 77 may be used to reduce the temperature of the core components downstream of the combustor 30.

A remaining portion of the airflow exiting the fan section 18, bypasses the LP compressor 24 and engine core 44 as a bypass airflow 78 and exits the gas turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the gas turbine engine 10, and/or used to cool or power other aspects of the aircraft. In the context of the gas turbine engine 10, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
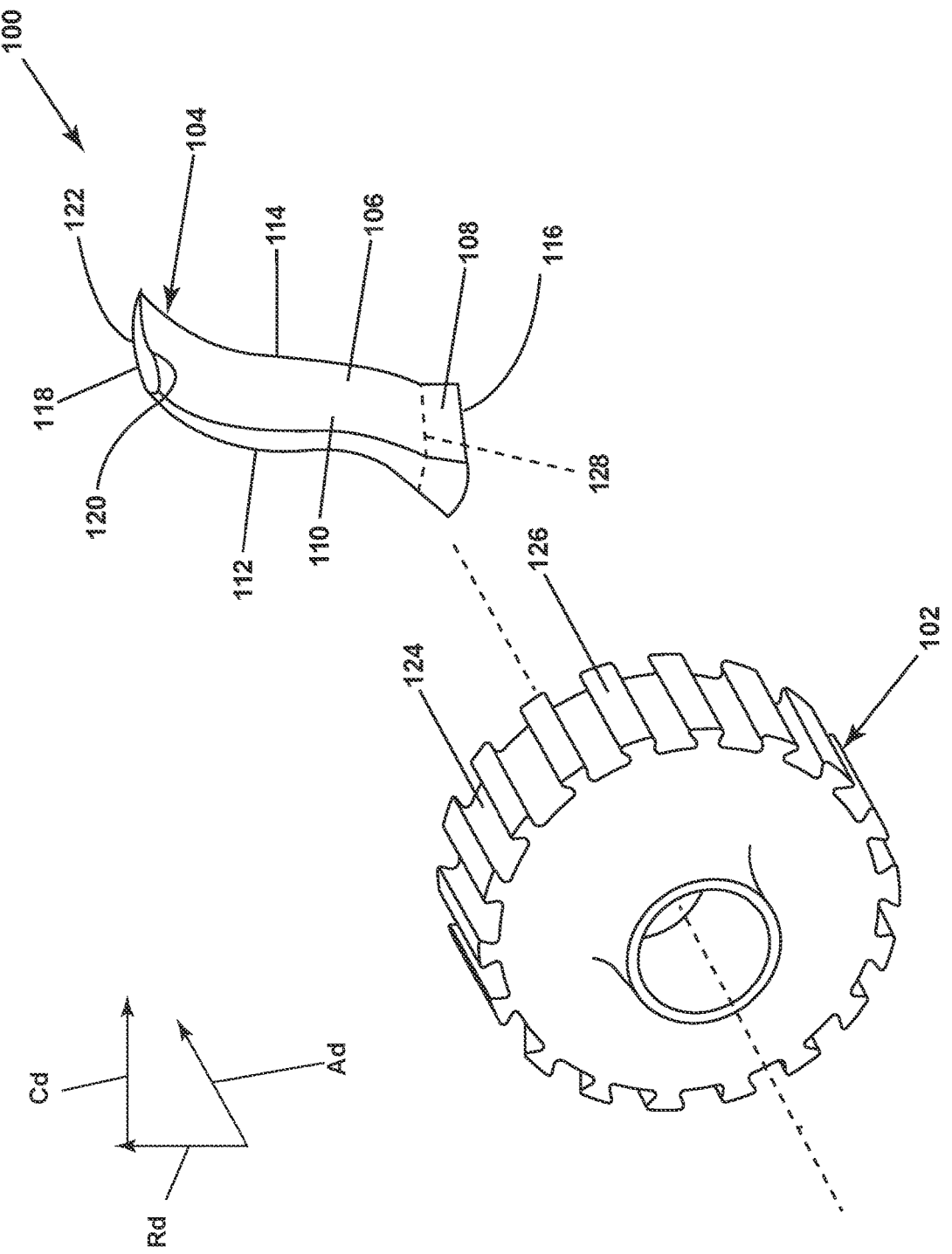
FIG. 2 is an exploded view of a composite airfoil assembly and disk assembly suitable for use within the gas turbine engine of FIG. 1, in accordance with an aspect of the present disclosure.

FIG. 2 is an exploded view of an airfoil assembly that comprises an assembly 100 including a rotatable disk 102 and a composite airfoil 104 suitable for use within the turbine engine 10 of FIG. 1.

The composite airfoil 104 includes an airfoil portion 106 and a dovetail portion 108 extending from the airfoil portion 106. For purposes of illustration, a transition 128 between the dovetail portion 108 and the airfoil portion 106 has been illustrated in broken lines. The dovetail portion 108 can define a portion of the composite airfoil 104 that flares circumferentially outward from the airfoil portion 106.

The airfoil portion 106 includes an outer wall 110. The outer wall 110 extends between a leading edge 112 and a trailing edge 114 to define a chord-wise direction. The airfoil portion 106 extends between a root 116 and a tip 118 to define a span-wise direction. The dovetail portion 108 terminates radially at the root 116. The airfoil portion 106 includes a pressure side 120 and a suction side 122.

The composite airfoil 104 couples to the disk 102 by inserting at least a portion of the composite airfoil 104, such as the dovetail portion 108, into a respective slot of a plurality of slots 124 extending into an exterior surface 126 of the disk 102. The composite airfoil 104 is held in place by frictional contact with the slot 124 or can be coupled to the slot 124 via any suitable coupling method such as, but not limited to, welding, adhesion, fastening, or the like. While only a single composite airfoil 104 is illustrated, it will be appreciated that there can be any number of one or more composite airfoils 104 coupled to the disk 102. As a non-limiting example, there can be a plurality of composite airfoils 104 corresponding to a total number of slots of the plurality of slots 124.

For the sake of reference, a set of relative reference directions, along with a coordinate system can be applied to the composite airfoil 104 and the disk 102. An axial direction (Ad) can extend from forward to aft and is shown extending at least partially into the page. The axial direction (Ad) can be arranged parallel to the engine centerline 12 (FIG. 1) in a non-limiting example. A radial direction (Rd) extends perpendicular to the axial direction (Ad), which can extend perpendicular to the engine centerline 12. A circumferential direction (Cd) can be defined perpendicular to the radial direction (Rd) locally, which can be defined along a curvature of a circumference about the axial direction (Ad), and/or can be defined along the circumference of the gas turbine engine 10 (FIG. 1) relative to the engine centerline 12.

Figure 3:
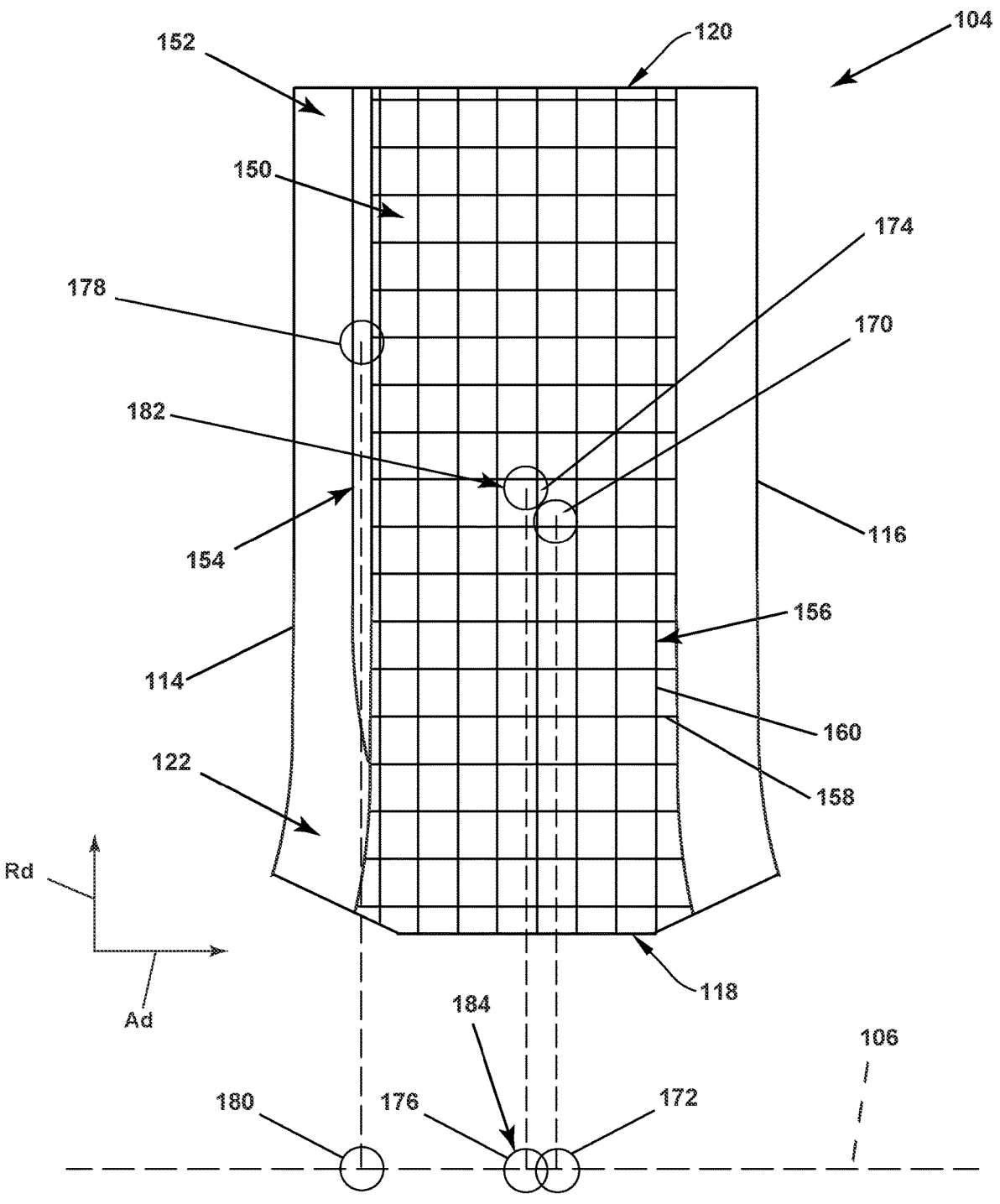
FIG. 3 is a schematic view of the composite airfoil assembly of FIG. 2 including a set of plies provided on a woven core, in accordance with an aspect of the present disclosure.

FIG. 3 illustrates a schematic view the composite airfoil 104 of FIG. 2 including a woven core 150 and a skin layer 152 positioned exterior of the woven core 150. A set of plies 154 can be provided onto or exterior of the woven core 150, and interior of the skin layer 152. The woven core 150 can be made at least partially of a woven structure. In a non-limiting example, the woven core 150 can be formed as a preform, or the woven core 150 with the set of plies 154 can be formed as a preform. In one non-limiting example, the woven structure of the woven core 150 can include a set of fibers 156 which can include a set of warp fibers 158 and a set of weft fibers 160. The set of warp fibers 158 and the set of weft fibers 160 can be interlaced or interwoven to at least partially form the woven core 150. In one non-limiting example, a Jacquard loom or 3D weaving machine can be used to create complex woven structures, which can include interweaving one or more materials or composites to form the woven core 150. Such materials or composites can include, in non-limiting examples, carbon or carbon fiber, glass or glass fiber, nylon, rayon, or other aramid fibers, while other materials such as nickel, titanium, or ceramic composites are contemplated.

In one non-limiting example, the first weave pattern can be a three-dimensional weave pattern. More specifically, the woven structure can be woven in a combination of the axial direction (Ad), the radial direction (Rd), and the circumferential direction (Cd) (FIG. 2), where the circumferential direction (Cd) extends into and out of the page as shown in FIG. 3. In another non-limiting example, the woven core 150 can include a braided weave pattern. A braided weave pattern can include a weave pattern that includes three or more interlaced fibers that are woven in a repeating pattern, for example. In another non-limiting example, the braided geometry can include a set of fibers or strands that are sequentially laid over one another to define the braided geometry. It should be appreciated that the weave pattern can be formed and defined in any three, mutually-orthogonal planes in order to define a three-dimensional object relative to said planes. For example, the three mutually orthogonal planes can include a first plane defined among the span-wise direction and the chord-wise direction, and with two additional mutually-orthogonal planes, both arranged orthogonal to the first plane and to one another.

The woven core 150 can be made from incoming raw materials, such as carbon or carbon fiber, glass or glass fiber, nylon, rayon, or other aramid fibers, nickel, titanium, or ceramic composites, as well as combinations thereof, or other suitable composite materials are contemplated. The woven core 150 including the first set of fibers 156, with the set of warp fibers 158 and the set of weft fibers 160, can be made from the raw materials. The raw materials can have material properties, such as mass, weight, stiffness, moment weight, moment mass, which can define a center of mass or mass distribution for the woven core 150. Utilizing the material properties of the raw materials can be utilized to determine application of the set of plies 154, such as amount or location of the set of plies 154. Such material properties can be utilized to determine application of the set of plies 154 to the woven core 150 across a set of manufactured composite airfoils 104, without measurement or examination of each woven core 150.

Prior to application of the skin layer 152, the set of plies 154 can be added exterior of the woven core 150. Each ply of the set of plies 154 can be a single-layer ply, while multi-layer plies are contemplated. The set of plies 154 as shown extends partially between the root 116 and the tip 118, while it is contemplated that the set of plies 154 can extend fully between the root 116 and the tip 118, the leading edge 112 and the trailing edge 114, or only a portion thereof. Additionally, each individual ply of the set of plies 154 can vary from that of another ply of the set of plies 154. For example, the span-wise length for the set of plies 154 varies, with each exterior ply for the set of plies 154 becoming successively shorter, covering a smaller area, chord-wise extent, span-wise extent, or combination thereof of the composite airfoil 104. Furthermore, the set of plies 154 can be on either of the pressure side 120 or the suction side 122 (FIG. 2), or both. Additionally, it is contemplated that arrangement of the set of plies 154 can be arranged as more than one set of plies, where areas or groups of sets of plies 154 are provided at different positions or portions of the composite airfoil 104. Such arrangements may be symmetric, such as sharing symmetry in the span-wise direction, the chord-wise direction, among the pressure side 120 or the suction side 122, or may be non-symmetric, with discrete or local arrangements of the sets of plies 154.

The skin layer 152 is positioned exterior of the woven core 150 and the set of plies 154, and can be provided on or applied to the woven core 150 and the set of plies 154. In one non-limiting example, the skin layer 152 can a laminated layer, and can be formed as a plurality of laminations or laminated plies formed together to define the skin layer 152. In additional non-limiting examples, the skin layer 152 can be comprised of composite materials, similar or dissimilar from that of the woven core 150, such as carbon or carbon fibers, glass or glass fibers, nylon, rayon, or other aramid fibers, while other materials such as nickel, titanium, or ceramic composites in non-limiting examples. The skin layer 152 can be sized and shaped to form the final airfoil shape, such as defining greater or lesser local geometries, masses, or thicknesses exterior of the woven core 150 and the set of plies 154. An exterior coating (not shown) provided on the skin layer 152 can form an exterior wall, while it is contemplated that one or more additional interior or exterior layers are provided interior or exterior of the skin layer 152. In one non-limiting example, an exterior coating can be a barrier coating, for example, to prevent erosion due to object impact, while additional properties are contemplated, such as hydrophobic or ice-phobic coatings, corrosion or erosion resistance, or ultraviolet resistant coatings. Additional finishing layers or materials can be provided, such as oxidation or corrosion resistant coatings or paint. Intermediate adhesive layers are further contemplated.

During manufacture, the woven core 150 has first mass distribution defining a mass (grams or pounds (lbs)), a moment mass (inch-lbs), a thickness (meters), a first center of mass 170, and a first center of rotation 172 rotatable about the engine centerline 12 (FIG. 1), among other material properties for the woven core 150. Variations among raw materials or composite materials used to manufacture the woven core 150 result in manufacturing variations from a balanced mass distribution across multiple produced units, such as where the first center of mass 170 is offset from a balanced center of mass 174, and the first center of rotation 172 is offset from a balanced center of rotation 176. Such an offset can be defined in any direction, such as the axial direction (Ad), the radial direction (Rd), or the circumferential direction (Cd), or any combination thereof. The variations formed in the woven core 150 during manufacture, whether resultant of manufacture itself or of the particular raw materials utilized, must be accounted for in order to ensure proper airfoil balance. Therefore, where a woven core 150 includes the first center of mass 170 that is offset from the balanced center of mass 174 or where the first center of rotation 172 is offset from the balanced center of rotation 176, it is desirable to complete manufacture of the composite airfoil 104 in a manner that balances the composite airfoil 104 by aligning the first center of mass 170 with the balanced center of mass 174, or by aligning the first center of mass 170 with the balanced center of rotation 176, or both. As fan blade count decreases and/or fan blade mass increases, relatively, the forces generated by an unbalanced mass distribution can increase, thereby increasing the potential impact an unbalanced airfoil can have on the remainder of the gas turbine engine 10 (FIG. 1), requiring greater care in ensuring proper airfoil balance.

Furthermore, curing of the woven core 150 can vary the mass distribution, resulting in movement of the first center of mass 170 during curing of the woven core 150. Curing of the woven core 150 can define a cured mass distribution having a cured center of mass and a cured center of rotation. It is within the scope of this disclosure to account for changes or variations in mass distribution resultant of curing the woven core 150, the set of plies 154, or other portions of the composite airfoil 104. That is, curing the woven core 150 can result in a cured mass distribution that varies from the first mass distribution having the first center of mass 170 and the first center of rotation 172. One or both of the first center of mass 170 or the first center of rotation 172 can vary from the cured center of mass or the cured center of rotation, respectively. In this way, curing of the woven core 150, the set of plies 154, or other portions of the composite airfoil 104 can be utilized to vary the mass distribution to balance the composite airfoil 104, or curing can be considered during addition of the set of plies 154 such that curing the composite airfoil 104 defines a mass distribution that matches or more-closely aligns with the balanced mass distribution.

In order to determine and account for any variations, manufacture of the woven core 150 can consider the particular raw materials utilized in forming the woven core 150, which can define the application, position, or amount of the set of plies 154 added to the woven core 150. For example, where a first raw material has a mass or weight defining a first mass distribution, the set of plies 154 can be added to vary the overall mass distribution of the woven core 150 to balance the woven core 150 by aligning the first center of mass 170 with the balanced center of mass 174. In this way, it should be appreciated that manufacture utilizing the particular raw material can forecast the position, number, thickness, material, or other aspects of the set of plies 154 for application across a full set of manufactured composite airfoils 104 or other units. Such a forecast can be utilized for similar materials across a wide range of units, woven cores 150, composite airfoils 104, or other composites in order to apply the set of plies 154 across multiple units in a consistent manner to achieve balance among the multiple woven cores 150 without measurement of each woven core 150 prior to application of the set of plies 154.

In another non-limiting example, the woven core 150 can be measured to determine the mass distribution, such as accounting for size, volume, mass, materials, moment mass, center of rotation, center of mass, local thickness, or combinations thereof, in non-limiting examples. The measurements be used to determine the mass distribution for the woven core 150, and therefore determine the first center of mass 170 and the first center of rotation 172. The first center of mass 170 and the first center of rotation 172 can be compared with expected values, such as comparison with the balanced mass distribution including the balanced center of mass 174 or the balanced center of rotation 176. Any variations between measured values and the values defined by the balanced center of mass 174 and the balanced center of rotation 176 indicates that the addition of the set of plies 154 can be utilized to balance the composite airfoil 104. Specifically, where the first center of mass 170 is misaligned, spaced, or offset from the balanced center of mass 174, or where the first center of rotation 172 is misaligned, spaced, or offset from the balanced center of rotation 176, the addition of the set of plies 154 or curing of the composite airfoil 104 can be used to move the first center of mass 170, being defined by the woven core 150 and the set of plies 154 collectively, to align with the balanced center of mass 174, or move the first center of rotation 172 to align with the balanced center of rotation 176, thereby balancing the composite airfoil 104. The set of plies 154 define their own mass distribution as a second mass distribution having a second center of mass 178 corresponding to a second center of rotation 180. Applying the set of plies 154 to the woven core 150 collectively defines a combined mass distribution including a combined center of mass 182 and a combined center of rotation 184, which can correspond to the balanced center of mass 174 and the balanced center of rotation 176, respectively. The addition of the set of plies 154 varies the first mass distribution of the woven core 150 to the combined mass distribution, which can correspond to or align with the balanced mass distribution. Such addition of the set of plies 154, or curing of the woven core 150 and the set of plies 154, permits balanced formation of the composite airfoil 104, despite the variation among raw materials. Additionally, the addition of the set of plies 154 can be limited by structural, sizing, or weight constraints, which may not permit complete alignment among the combined mass distribution and the balanced mass distribution. In such an example, it should be understood that the application of the set of plies 154 can move the combined center of mass or the combined center of rotation nearer to the balanced center of mass or the balanced center of rotation, being nearer than that of the first mass distribution, the first center of mass, or the first center of rotation, without being fully aligned.

Additionally, it is contemplated that the addition of the set of plies 154 can be done in anticipation of the addition of the skin layer 152. That is, the addition of the set of plies 154 can vary the woven core 150 in expectation of the addition of the skin layer 152. More specifically, where the addition of the skin layer 152 can vary the mass distribution in a way that varies the position of the first center of mass 170 or the first center of rotation 172 away from the balanced mass distribution, it is contemplated that the set of plies 154 can be added, leaving an offset or misalignment with balanced center of mass 174 or the balanced center of rotation 176, which is anticipated to be aligned upon addition of the skin layer 152. The addition of the skin layer 152 or the set of plies 154 can account for the anticipated variation that remains from set of plies 154 or results from addition of the skin layer 152 itself, such that the application of the skin layer 152 exterior of the set of plies 154 varies the first center of mass 170 to align with the balanced center of mass 174, or varies the first center of rotation 172 to align with the balanced center of rotation 176. The addition of the skin layer 152 can vary the mass distribution by varying the size, mass, volume, moment mass, center of mass, center of rotation, or local thickness for the composite airfoil 104. Even where the skin layer 152 is provided uniformly across the woven core 150 and set of plies 154, variations in the shape and geometry of the woven core 150 can result in an uneven application of the skin layer 152 to the composite airfoil 104. Therefore, it is within the scope of this disclosure to provide the set of plies 154 in order to account for an anticipated variation in size, volume, mass, moment mass, center of rotation, center of mass, or local thickness resultant of the skin layer 152. In a further non-limiting example, it is contemplated that the set of plies 154 may be applied at least partially exterior of the skin layer 152, and that additional exterior or finishing layers are provided exterior of both the skin layer 152 and the set of plies 154.

Referring to FIG. 4, a method 200 of forming a composite airfoil, such as the composite airfoil 104 (FIG. 3) or another composite component for a gas turbine engine such as the gas turbine engine 10 (FIG. 1) or for a non-turbine or non-aircraft component. The composite airfoil 104 can include a balanced mass distribution, permitting balance rotation or operation when utilized within the gas turbine engine 10. The method 200 includes, at 202, forming a core defining a first mass distribution. The core can be the woven core 150 (FIG. 3), in a non-limiting example, and can be a braided or laminated core in additional non-limiting examples. The woven core 150 can be made from a raw material, or a set of raw materials, having one or more material properties that define a first center of mass 170 that is offset from the balanced center of mass 174.

At 204, the method 200 can include curing the woven core 150. During curing of the woven core 150, the thickness or density of the raw material or set of raw materials can change due to the curing process. It is within the scope of this disclosure that the first mass distribution can be changed during curing of the woven core 150, such that the first mass distribution is represented as a post-curing first mass distribution, while a non-cured first mass distribution is contemplated.

At 206, the method 200 can include measuring the woven core 150 to determine the first mass distribution for the formed core. Measuring can include, in non-limiting examples, weighing the woven core 150, determining a size of the woven core 150, and determining a spatial distribution of mass within the woven core 150. In a non-limiting example, modelling can be used to determine the first mass distribution, such as using non-homogeneous differential analysis. Measuring the woven core 150 can be used to output the first mass distribution. Where application of the set of plies 154 is based upon the material properties of the raw materials used to form the woven core 150, it is contemplated that the measurement at 206 can be based on the material properties of the raw materials, rather than measurement of the woven core 150. For example, where application of the set of plies 154 is based upon the material properties of the raw materials, measurement of a woven core 150 having the set of plies 154 added can be undertaken, to ensure that balance has been achieved or is within acceptable thresholds, and to ensure application of set of plies 154 across a set of multiple units achieves a proper balance for the set of multiple units. Measurement of each individual woven core 150 can be impractical in practice for multiple manufactured composite airfoils 104. Utilizing common variations across multiple units specific to the particular raw materials permits balancing a multitude of units without measurement of each individual woven core 150.

At 208, the method 200 can include comparing the first mass distribution to the balanced mass distribution to define an unbalanced mass distribution. The unbalanced mass distribution can be a value or representation of a variation of the formed core from the balanced mass distribution. Variations among raw or composite materials result in variations in the first mass distribution from the balanced mass distribution. The unbalanced mass distribution can be representative of the variation of the first mass distribution from the balance mass distribution.

At 210, the method 200 can include coupling, laminating, or otherwise applying a set of plies to the woven core 150, such as the set of plies 154 (FIG. 4). The set of plies can be positioned or arranged on the woven core 150, which can collectively define a second mass distribution. Determination of a position, thickness, mass, amount, or type of material utilized as the set of plies can be based on the determined unbalanced mass distribution determined at 208, or based upon the raw materials utilized at 202 to form the woven core 150. Specifically, the set of plies 154 can be applied to vary the first mass distribution, which can be based upon the unbalanced mass distribution, such that the second mass distribution is nearer to or more closely matches the balanced mass distribution.

At 212, the method 200 can include curing the woven core 150 with the set of plies 154. During curing, the thickness of the materials can change due to the curing process. It is within the scope of this disclosure that the second mass distribution can be changed during curing, and that the balanced mass distribution can consider changes during curing of the component.

At 214, the method 200 can include measuring the woven core 150 with the set of plies. Measuring can include, in non-limiting examples, weighing the woven core 150, determining a size of the woven core 150, and determining a spatial distribution of mass within the woven core 150. In a non-limiting example, modelling can be used to determine the second mass distribution, such as using non-homogeneous differential analysis. Measuring after application of the set of plies 154 to the woven core 150 can ensure that the second mass distribution matches the balanced mass distribution, or that such a variation from the balanced mass distribution is within acceptable thresholds. In one example, measuring the woven core 150 with the set of plies 154 can be utilized to determine accurate balancing relative to the raw materials utilized to form the woven core 150, which can be applied across a full set of manufactured units. Measurement of an initial unit can determine if proper balancing is achieved, and should be properly applied across multiple manufactured units.

At 216, the method 200 can include adding a skin layer, such as the skin layer 152 (FIG. 3), exterior of the set of plies 154 and the woven core 150. In a non-limiting example, adding the skin layer 152 can further include curing the skin layer 152 or finishing the skin layer 152. It should be further appreciated that the skin layer 152 can be cured, and that it is contemplated that curing of the skin layer 152 can be accomplished at the same time as curing the woven core 150. In such an example, it is contemplated that applying the skin layer at 216 can be done prior to curing of the core at 204 or 212, such that curing of the entire composite airfoil 104, or portion thereof such as the woven core 150, can be accomplished at the same time as curing of the skin layer 152. It should be appreciated that curing of one or more portions can be done simultaneously, and it is within the scope of this method 200 to incorporate the application of the skin layer 152, and curing thereof, into application of curing of other portions of the composite airfoil 104. Additionally, any other finishing features or analysis can be added or performed, such as adding exterior coatings exterior of the skin layer in a non-limiting example.

The aspects described herein provide a process or method of forming a component, such as an airfoil, as well as the formed component itself, provide for improved balance despite variations from raw materials. Such an improved balance increases efficiency, as well as increasing component lifetime and reducing maintenance. As gas turbine engines seek to reduce blade count, balancing of each blade becomes increasingly important. The aspects disclosed herein permit balancing of composite airfoils with woven cores suitable for use with reduced blade counts. Utilizing variations resultant of raw materials can reduce manufacturing costs and time, as well as a reduction or elimination of measurement across multiple manufactured units, reducing required time to ensure balance at manufacture. Such increased efficiency and lifetime with reduced maintenance results in decreased costs. Additionally, the aspects described herein provide for greater control over final airfoil weight, moment weight, and thickness, which results in greater control over balancing of the airfoil.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a fan section, a compressor section, combustion section, and turbine section in serial flow arrangement, and defining an engine centerline extending between a forward direction and an aft direction; and at least one composite airfoil provided in one of the fan section, the compressor section, or the turbine section and rotatable about the engine centerline, the at least one composite airfoil having a balanced mass distribution defining a balanced center of mass aligned with a balanced center of rotation arranged along the engine centerline, with the at least one composite airfoil comprising: a woven core defining a first mass distribution having a first center of rotation; a set of plies, coupled to the woven core, and defining a second mass distribution; and a skin layer provided exterior of the set of plies and the woven core; wherein the combination of the first mass distribution and the second mass distribution collectively defines a combined mass distribution that is nearer to the balanced center of rotation than the first center of rotation.

The gas turbine engine of any preceding clause, wherein the combined mass distribution defines a combined center of rotation that aligns with the balanced center of rotation.

The gas turbine engine of any preceding clause, wherein the woven core is made from a raw material that defines the first mass distribution differing from the balanced mass distribution.

The gas turbine engine of any preceding clause, wherein the raw material is one of carbon or carbon fibers, glass or glass fibers, nylon, rayon, aramid fibers, nickel, titanium, or ceramic composites.

The gas turbine engine of any preceding clause, wherein the raw material includes material properties defining the first mass distribution that differs from the balanced mass distribution.

The gas turbine engine of any preceding clause, wherein the at least one composite airfoil comprises multiple composite airfoils, and wherein the raw material defines a common first mass distribution among the multiple composite airfoils that commonly differ from the balanced mass distribution.

The gas turbine engine of any preceding clause, wherein the combined center of mass aligns with the balanced center of rotation arranged along the engine centerline.

The gas turbine engine of any preceding clause, wherein the combined mass distribution further defines a combined center of rotation that is aligned with the balanced center of rotation.

The gas turbine engine of any preceding clause, wherein the combined center of mass is aligned with the balanced center of mass.

The gas turbine engine of any preceding clause, wherein the first mass distribution defines a first center of mass that corresponds to a first center of rotation arranged along the engine centerline, wherein the second mass distribution defines a second center of mass that corresponds to a second center of rotation defined relative to the engine centerline, and wherein the first center of rotation is spaced from the second center of rotation.

The gas turbine engine of any preceding clause, wherein the woven core is a cured woven core that defines a cured mass distribution having a cured center of mass and a cured center of rotation.

The gas turbine engine of any preceding clause, wherein the cured mass distribution varies from the first mass distribution by a variation between the first center of mass and the cured center of mass or by a variation between the first center of rotation and the cured center of rotation.

The gas turbine engine of any preceding clause, wherein the at least one composite airfoil further comprises a pressure side and a suction side, extending between a root and a tip defining a span-wise direction therebetween, and extending between a leading edge and a trailing edge defining a chord-wise direction therebetween.

The gas turbine engine of any preceding clause, wherein the set of plies extend fully from the root to the tip.

The gas turbine engine of any preceding clause, wherein the set of plies are provided on at least one of the pressure side and the suction side.

The gas turbine engine of any preceding clause, wherein the set of plies are provided on both the pressure side and the suction side.

The gas turbine engine of any preceding clause, wherein the woven core is a braided core.

A composite airfoil for a gas turbine engine, the composite airfoil defining a balanced mass distribution including a balanced center of mass aligned with a balanced center of rotation, the composite airfoil comprising: a woven core defining a first mass distribution having a first center of rotation; a set of plies, coupled to the woven core, and defining a second mass distribution; and a skin layer provided exterior of the set of plies and the woven core; wherein the combination of the first mass distribution and the second mass distribution collectively defines a combined mass distribution that is nearer to the balanced center of rotation than the first center of rotation.

The gas turbine engine of any preceding clause, wherein the combined mass distribution defines a combined center of rotation that aligns with the balanced center of rotation.

The gas turbine engine of any preceding clause, wherein the woven core is made from a raw material that defines the first mass distribution differing from the balanced mass distribution.

The gas turbine engine of any preceding clause, wherein the combined mass distribution defines a combined center of mass and a combined center of rotation, wherein the combined center of mass aligns with the balanced center of rotation relative to the engine centerline.

A method of forming a composite airfoil having a balanced mass distribution defining a balanced center of mass corresponding to a balanced center of rotation arranged along a rotational axis for a gas turbine engine, the method comprising: forming a woven core defining a first mass distribution; and applying a set of plies to the woven core, the set of plies defining a second mass distribution; wherein the woven core and the set of plies define a combined mass distribution with a combined center of mass defining a combined center of rotation that corresponds to the balanced center of rotation along the rotational axis.

The method of any preceding clause, wherein forming the woven core further comprises forming the woven core from a raw material defining the first mass distribution.

The method of any preceding clause, wherein the raw material is one of carbon or carbon fibers, glass or glass fibers, nylon, rayon, aramid fibers, nickel, titanium, or ceramic composites.

The method of any preceding clause, wherein the raw material includes material properties defining the first mass distribution that differs from the balanced mass distribution.

The method of any preceding clause, further comprising measuring the woven core to determine the first mass distribution.

The method of any preceding clause, further comprising comparing the first mass distribution to the balanced mass distribution to define an unbalanced mass distribution.

The method of any preceding clause, wherein the second mass distribution is determined based on the unbalanced mass distribution.

The method of any preceding clause, wherein comparing the first mass distribution to the balanced mass distribution further includes comparing a first center of mass defined by the first mass distribution to a balanced center of mass defined by the balanced mass distribution.

The method of any preceding clause, further comprising curing the woven core to define a cured first mass distribution as the first mass distribution.

The method of any preceding clause, further comprising curing the woven core and the set of plies to define a cured combined mass distribution as the combined mass distribution.

The method of any preceding clause, wherein the cured combined mass distribution defines the combined center of rotation to align with the balanced center of rotation.

A method of forming a set of composite airfoils, each composite airfoil of the set of composite airfoils having a balanced mass distribution defining a balanced center of mass corresponding to a balanced center of rotation relative to a rotational axis, the method comprising: forming a set of woven cores from a raw material, with each woven core of the set of woven cores defining a first mass distribution; and applying a set of plies to each woven core of the set of woven cores, wherein each set of plies defines a second mass distribution; wherein the woven core and the set of plies for each composite airfoil for the set of composite airfoils defines a combined mass distribution with a combined center of mass defining a combined center of rotation that corresponds to the balanced center of rotation along the rotational axis.

The method of any preceding clause, wherein the raw material defines a common first mass distribution among the set woven cores that commonly differs from the balanced mass distribution for each composite airfoil of the set of airfoils.

What is claimed is:

1. A gas turbine engine comprising:
a fan section, a compressor section, a combustion section, and a turbine section in serial flow arrangement, and defining an engine centerline extending between a forward direction and an aft direction; and
at least one composite airfoil provided in one of the fan section, the compressor section, or the turbine section and rotatable about the engine centerline, the at least one composite airfoil having a balanced mass distribution defining a balanced center of mass aligned with a balanced center of rotation defined relative to the engine centerline, with the at least one composite airfoil comprising:
a woven core defining a first mass distribution having a first center of rotation;
a set of plies, coupled to the woven core, and defining a second mass distribution; and
a skin layer provided exterior of the set of plies and the woven core;
wherein the combination of the first mass distribution and the second mass distribution collectively defines a combined mass distribution that is nearer to the balanced center of rotation than the first center of rotation.

2. The gas turbine engine of claim 1, wherein the combined mass distribution defines a combined center of rotation that aligns with the balanced center of rotation.

3. The gas turbine engine of claim 1, wherein the woven core is made from a raw material that defines the first mass distribution differing from the balanced mass distribution.

4. The gas turbine engine of claim 3, wherein the raw material includes material properties defining the first mass distribution that differs from the balanced mass distribution.

5. The gas turbine engine of claim 3, wherein the at least one composite airfoil comprises multiple composite airfoils, and wherein the raw material defines the first mass distribution that is common among the multiple composite airfoils that commonly differ from the balanced mass distribution.

6. The gas turbine engine of claim 1, wherein the combined mass distribution defines a combined center of mass and a combined center of rotation, wherein the combined center of mass aligns with the balanced center of rotation relative to the engine centerline.

7. The gas turbine engine of claim 6, wherein the combined center of rotation is aligned with the balanced center of rotation.

8. The gas turbine engine of claim 6, wherein the combined center of mass is aligned with the balanced center of mass.

9. The gas turbine engine of claim 1, wherein the first mass distribution defines a first center of mass that corresponds to a first center of rotation relative to the engine centerline, wherein the second mass distribution defines a second center of mass that corresponds to a second center of rotation relative to the engine centerline, and wherein the first center of rotation is spaced from the second center of rotation.

10. The gas turbine engine of claim 1, wherein the woven core is a cured woven core that defines a cured mass distribution having a cured center of mass and a cured center of rotation.

11. The gas turbine engine of claim 10, wherein the cured mass distribution varies from the first mass distribution by a variation between the first center of mass and the cured center of mass or by a variation between the first center of rotation and the cured center of rotation.

12. A composite airfoil for a gas turbine engine, the composite airfoil defining a balanced mass distribution including a balanced center of mass aligned with a balanced center of rotation, the composite airfoil comprising:

a woven core defining a first mass distribution having a first center of rotation;

a set of plies, coupled to the woven core, and defining a second mass distribution; and a skin layer provided exterior of the set of plies and the woven core;

wherein the combination of the first mass distribution and the second mass distribution collectively defines a combined mass distribution that is nearer to the balanced center of rotation than the first center of rotation.

13. The composite airfoil of claim 12, wherein the combined mass distribution defines a combined center of rotation that aligns with the balanced center of rotation.

14. The composite airfoil of claim 12, wherein the woven core is made from a raw material that defines the first mass distribution differing from the balanced mass distribution.

15. The composite airfoil of claim 12, wherein the combined mass distribution defines a combined center of mass and a combined center of rotation, wherein the combined center of mass aligns with the balanced center of rotation.

16. A method of forming a composite airfoil having a balanced mass distribution defining a balanced center of mass aligned with a balanced center of rotation arranged along a rotational axis for a gas turbine engine, the method comprising: forming a woven core defining a first mass distribution having a first center of rotation; and applying a set of plies to the woven core, the set of plies defining a second mass distribution; adding a skin layer exterior of the set of plies and the woven core, wherein the first mass distribution and the second mass distribution collectively define a combined mass distribution that is nearer to the balanced center of rotation than the first center of rotation.

17. The method of claim 16, wherein forming the woven core further comprises forming the woven core from a raw material defining the first mass distribution.

18. The method of claim 17, wherein the raw material includes material properties defining the first mass distribution that differs from the balanced mass distribution.

19. The method of claim 16, further comprising measuring the woven core to determine the first mass distribution.

20. The method of claim 19, further comprising comparing the first mass distribution to the balanced mass distribution to define an unbalanced mass distribution.

\* \* \* \* \*